United States Patent
Wang et al.

(10) Patent No.: US 7,126,721 B2
(45) Date of Patent: Oct. 24, 2006

(54) PROTECTING PRINTED ITEMS INTENDED FOR PUBLIC EXCHANGE WITH GLOSSMARKS

(75) Inventors: Shen-ge Wang, Fairport, NY (US); Beilei Xu, Penfield, NY (US); Chu-heng Liu, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 1097 days.

(21) Appl. No.: 10/184,219

(22) Filed: Jun. 27, 2002

(65) Prior Publication Data

US 2004/0001233 A1 Jan. 1, 2004

(51) Int. Cl.
 *H04N 1/405* (2006.01)
 *G06K 15/00* (2006.01)
 *B41M 3/10* (2006.01)

(52) U.S. Cl. ............... 358/3.06; 358/3.2; 358/3.28; 283/113

(58) Field of Classification Search .......... 358/1.9, 358/3.06, 3.13–3.2, 3.09, 3.26–3.28, 533–536; 382/237, 270; 235/494; 283/113
See application file for complete search history.

(56) References Cited

U.S. PATENT DOCUMENTS

| | | | |
|---|---|---|---|
| 4,210,346 A | 7/1980 | Mowry, Jr. et al. | 283/94 |
| 4,310,180 A | 1/1982 | Mowry, Jr. et al. | 283/67 |
| 5,087,507 A | 2/1992 | Heinzer | 428/195.1 |
| 5,487,567 A | 1/1996 | Volpe | 283/72 |
| 5,583,660 A | 12/1996 | Rylander | 358/3.17 |
| 5,678,133 A | 10/1997 | Siegel | 399/67 |
| 5,695,220 A | 12/1997 | Phillips | 283/91 |
| 5,734,752 A | 3/1998 | Knox | 382/212 |
| 5,788,285 A | 8/1998 | Wicker | 283/93 |
| 5,853,197 A | 12/1998 | Mowry, Jr. et al. | 283/91 |
| 6,108,512 A | 8/2000 | Hanna | 399/366 |
| 6,606,168 B1* | 8/2003 | Rylander | 358/3.09 |
| 6,714,320 B1* | 3/2004 | Nakahara et al. | 358/3.13 |
| 6,906,825 B1* | 6/2005 | Nakahara et al. | 358/1.9 |

FOREIGN PATENT DOCUMENTS

| | | |
|---|---|---|
| EP | 0 859 506 A1 | 8/1998 |
| GB | 2 217 258 A | 10/1989 |

* cited by examiner

*Primary Examiner*—Scott A. Rogers
(74) *Attorney, Agent, or Firm*—Christopher D. Wait (57) ABSTRACT

The present invention relates to protecting printed items intended for public exchange having important informational indicia provided therein. The print items are protected from tampering by providing an informational indicia image as a glossmark. By selectively applying halftones with anisotropic structure characteristics which are significantly different in orientation while remaining identical in density to render information indicia, a glossmark image is produced of the information indicia. Such an information indicia glossmark image when provided in print item image helps protect that print item image from tampering.

68 Claims, 5 Drawing Sheets

PROTECTING PRINTED ITEMS INTENDED FOR PUBLIC EXCHANGE WITH GLOSSMARKS

CROSS REFERENCE

Cross reference is made to the following applications, the disclosures of each of which are totally incorporated by reference herein: application Ser. No. 10/159,432, entitled "APPLICATION OF GLOSSMARKS FOR GRAPHICS ENHANCEMENT" to inventors Shen-ge Wang, Beilel Xu, and Chu-heng Liu; application Ser. No. 10/159,423, entitled "HALFTONE IMAGE GLOSS CONTROL FOR GLOSSMARKS" to inventors Shen-ge Wang, Beilei Xu, and Chu-heng Liu; application Ser. No. 10/186,065, entitled "VARIABLE GLOSSMARK"to inventors Beilei Xu, Shen-ge Wang, and Chu-heng Liu. The appropriate components and processes of the above co-pending applications may be selected for the invention of the present application in embodiments thereof.

BACKGROUND

The present invention in various embodiments relates generally the gloss inherent in the hardcopy of image data be it pictorial or text. More particularly, this invention relates to halftoned image data and the control of differential gloss when that halftone image data is printed into hardcopy.

It is desirable to have a way to protect against copying or other fraudulent misrepresentation of a document. Most desirably in a manner that part of the content can be readily observed by a human reader but not by a copier scanner. It is particularly desirable that such a solution be available for such paper items as are commonly used publicly as icons of exchange. Two particular examples of such icons of exchange would be coupons and tickets, though there are many other paper items used as symbolic representations of exchange such as certificates, diplomas, passports, et cetera which are contemplated here as well. One approach is where an image is printed using clear toner or ink, creating a difference in reflected light and diffused light that can be discerned by a human reader by holding the paper at an angle, but cannot be detected by a copier scanner which is restricted to reading at right angles to the page. However, any such system needs to be inexpensive and resistant to tampering or manipulation.

Coupons have long been utilized by manufacturers and retailers as an incentive to consumers. With the advent of the internet and the world-wide-web, the business world has responded by offering electronic versions of coupons. These coupons are downloaded and printed locally by the consumer. However, as these coupons have monetary value indicated thereon and are digital image data, they may be manipulated by the less scrupulous with an editing program running on a computer. It would be desirable to provide a print item less susceptible to such tampering.

There has been a long felt need for a printer that can print a page that can be read but not copied. One method, described in U.S. Pat. Nos. 4,210,346 and 5,695,220, is to use a particular white toner and a particular white paper that are designed to have different diffused light characteristics at different angles. Of course, this system requires special, matched paper and toner.

In U.S. Pat. No. 6,108,512 to Hanna, there is illustrated, for example, a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case, the diffused light is approximately equal for both toned and untoned surfaces, the scanner will detect no difference and the copier will not be able to copy the original.

Another approach taken to provide a document for which copy control is provided includes digital watermarking. As an example, in U.S. Pat. No. 5,734,752 to Knox, there is illustrated a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

For each of the above patents and citations, the disclosures therein are totally incorporated herein by reference in their entirety.

The present invention relates to a method for protecting a printed item comprising printing a glossmark information indicia image upon the printed item. The glossmark information indicia image is realized by employing a methodology comprising selecting a first halftone having a first anisotropic structure orientation and selecting a second halftone having a second anisotropic structure orientation different from that of the first halftone. The first halftone is applied for at least some portion of the glossmark information indicia image, and the second halftone is applied for the remaining portion of the glossmark information indicia image.

The present invention also relates to a print item comprising a substrate and an information indicia glossmark image printed on the substrate. The information indicia glossmark image further comprising an information indicia, a first halftone having a first anisotropic structure orientation and, a second halftone having a second anisotropic structure orientation different from the first halftone, where the first halftone is applied as to a portion of the information indicia glossmark image and the second halftone is applied as to the remainder of the information indicia glossmark image so as to depict the information indicia as a glossmark.

The present invention further relates to a print item image comprising an information indicia, a background data image, a first halftone having a first anisotropic structure orientation and, a second halftone having a second anisotropic structure orientation different from the first halftone. The first halftone is selectively applied as to a portion of the background data image, and the second halftone is selectively applied as to a remainder of the background data image where the information indicia is used to select when to toggle between the first and second halftones such that the resulting print item image when printed will depict the information indicia as a glossmark.

DESCRIPTION

By proper utilization of the perceived differential gloss inherent between various anisotropic halftone dot structures, the desired manipulation of perceived gloss and the generation of glossmarks via that differential gloss may be achieved without the need for special paper or special toners or inks. By providing print items with information indicia glossmark images, those print item images may be protected from tampering. Such electronic print item images are exemplary for electronic distribution.

Figure 1:
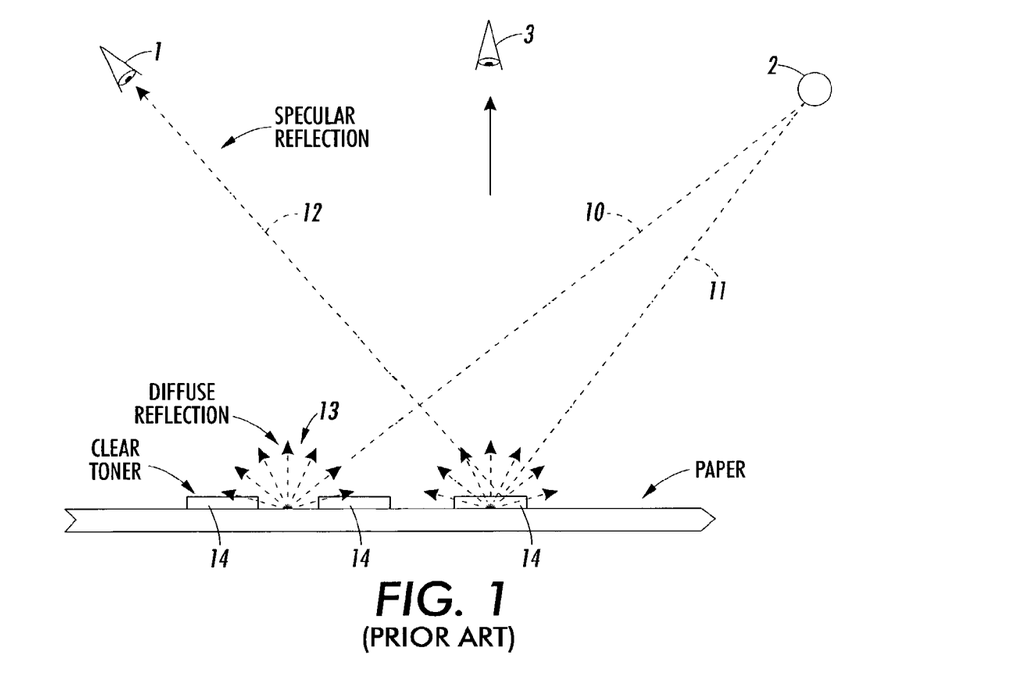
FIG. 1 shows how the human eye can detect a large difference between the glossy portions of the page but a scanner detector cannot.

FIG. 1 shows how the human eye 1 can read gloss upon the page and a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner cannot detect a difference. This is one manner for creating a gloss image which cannot be scanned by conventional copiers and scanners.

Figure 2:
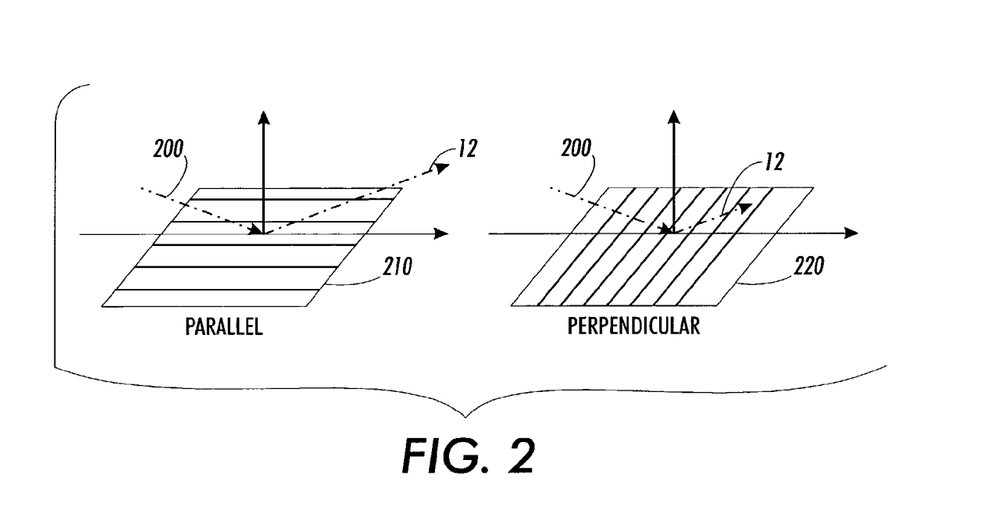
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a glossmark. The perceptibility of this gloss differential will be maximized when the halftone anisotropic orientations are 90 degrees apart as shown here in FIG. 2.

Figure 3:
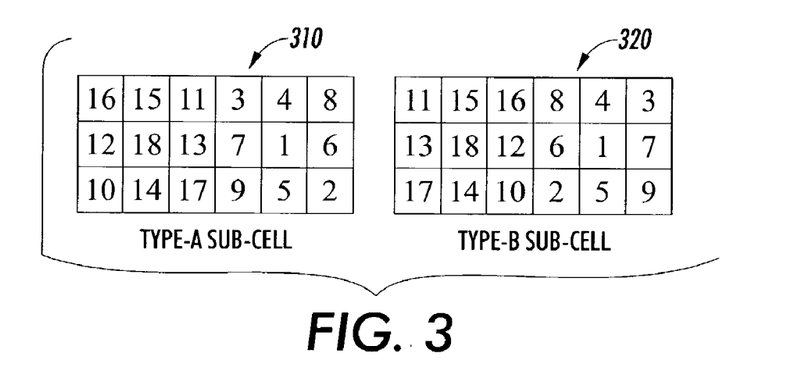
FIG. 3 shows two 3×6 halftone patterns suitable in anisotropic structure to produce discernable gloss differential for practicing the present invention.
Figure 4:
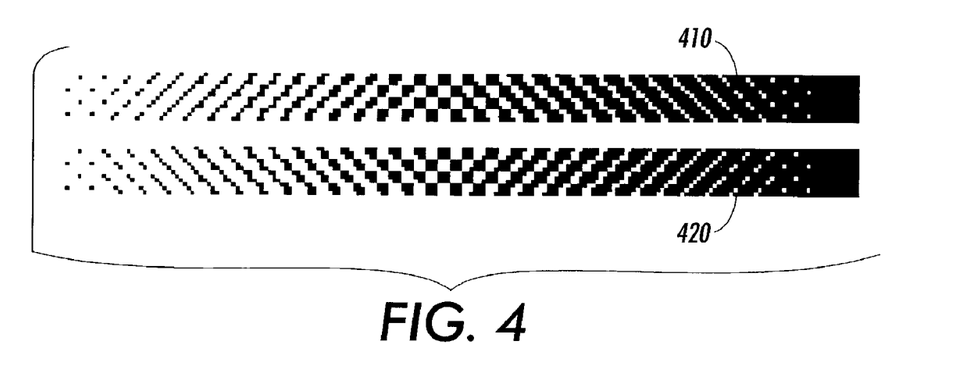
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
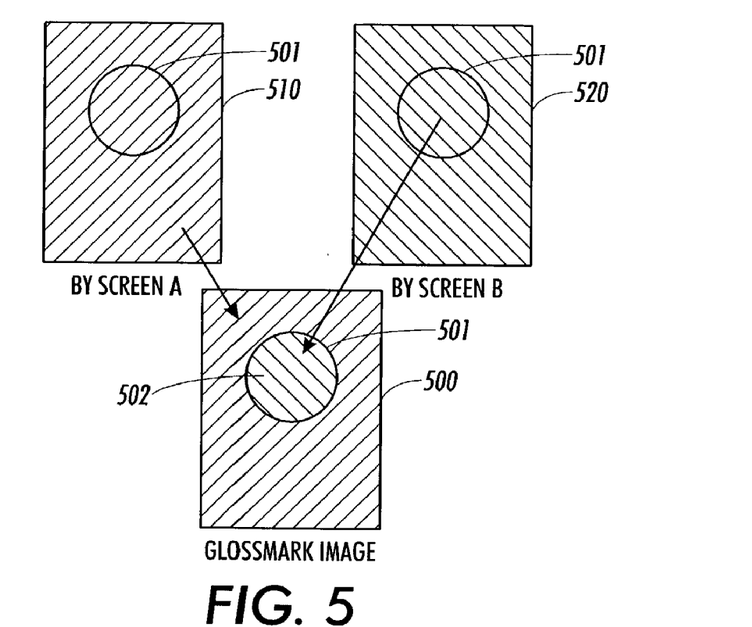
FIG. 5 depicts a patchwork alternating of the two halftone patterns of FIG. 3 so as to achieve a glossmark.

FIG. 5 depicts a glossmark image 500 achievable using halftone cells as described above. Screen-A 510 uses one halftone cell type and screen-B 520 uses the other. The circle 501 is provided as a visual aid across the image screens 500, 510 and 520. The desired glossmark here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the glossmark image 500.

Figure 6:
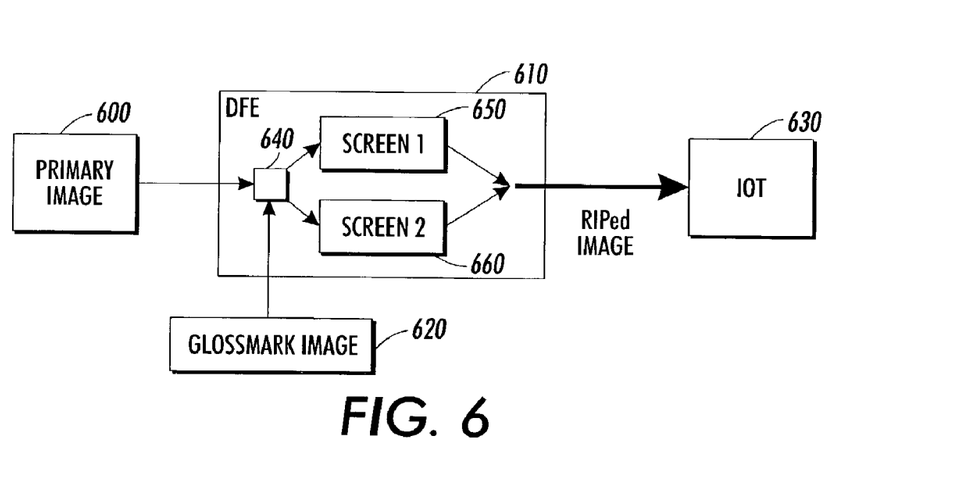
FIG. 6 shows one embodiment for achieving the image directed alternation of the halftone patterns for glossmarks as depicted in FIG. 5, utilizing the halftone patterns of FIG. 3.

An another approach for the assembly of a glossmark image is diagramed in FIG. 6. Here, the primary image 600 is received as input data to the digital front-end (DFE) 610 as is normal. However, a desired glossmark image 620 is also received as input data to the DFE 610 as well. The processed image as sent to the image output terminal (IOT) 630 is a binary image by halftoning the primary image 600 data as is normal. However, the halftone type selection is driven by the intended glossmark image data 620 as input to multiplexer switch 640. The intended glossmark image data 620 will serve to direct a portion of the primary image 600 to use a first anisotropic structured halftone while directing an alternative halftone to be used for the remainder of primary image 600. As will be understood by those skilled in the art, the intended glossmark image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired glossmark data 620, to produce the composite result of raster input processed (RIP) image data as passed to the IOT 630. In this way, a superimposition of a pattern 620 is imbedded into the primary image 600 which can only be perceived as gloss differential glossmark.

Figure 7:
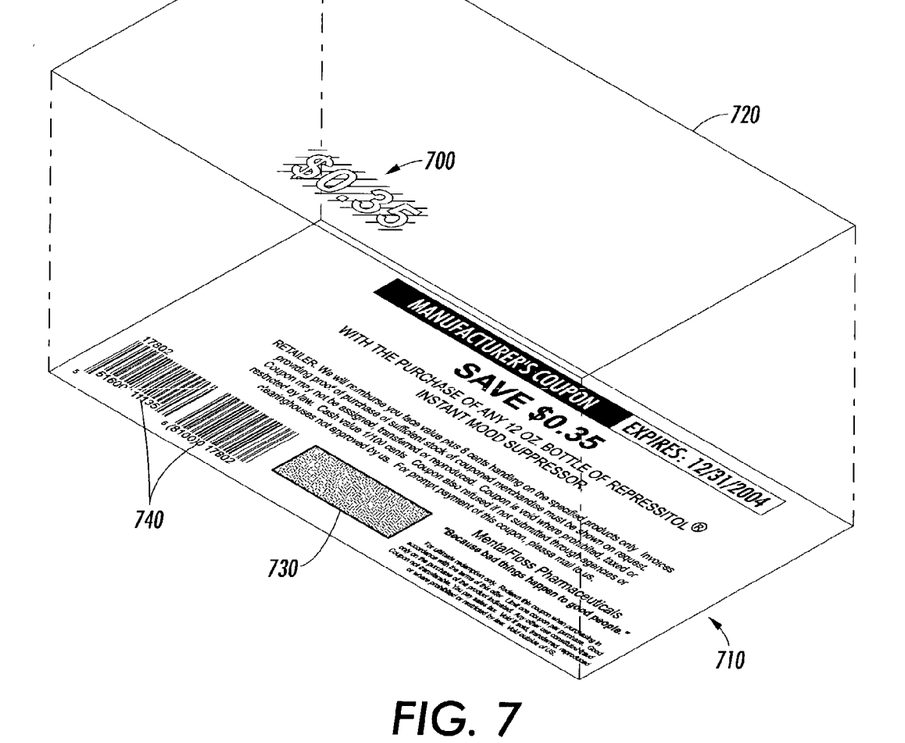
FIG. 7 depicts a coupon embodiment of the present invention with information indicia as a glossmark.

In FIG. 7, there is depicted an example of a coupon providing an embodiment of the present invention. An indicia of monetary value is to be superimposed as a glossmark 700 upon the coupon 710 in accord with the disclosure and description provided above as an information indicia glossmark image. The monetary indicia glossmark data 700 is depicted here as upon layer 720 for the ease of visualization. The data 700 is to be superimposed as per the technique of FIG. 6 onto the background gray tone area 730 of the coupon 710. Such indicia when rendered as a glossmark, particularly when rendered at a high resolution, is not readily copied because copy machines are especially unequipped to detect and register gloss information. Furthermore, current image editing software for personal computer use is ill equipped to deal with glossmarks. This is important as far as electronically distributed coupons or tickets are concerned. Distribution of such printed items has been limited heretofore because of the potential for falsification by those deficient perhaps as to scruples or otherwise tempted. The problem arises from the relative ease with which personal computers enable the matching of fonts and editing of same, within any given digital image such as an electronic coupon or ticket comprises. This means that where indicia of coupon value (or the serial number for a ticket) is found these tools will allow the user to readily modify and thereby tamper with the monetary value (or serial number).

The primary manner for which business have dealt with this problem has simply been to limit the value of coupons or tickets to relatively inconsequential amounts. In this way any redeemer is on-notice whenever there is a coupon for any significant monetary amount. Never-the-less, such tampering has been observed by various clearing houses which administer to the coupon trade. Glossmarking as to sensitive information to provide information indicia glossmark images allows for the expansion of electronic dissemination of such printed items because of its reticence to tampering while also providing ease of viewing and having no requirement for special paper or toner/inks. In short, glossmarking provides for greater security and is exemplary thereby for allowing the dissemination of larger value offerings without diluting any of the cost and convenience of dissemination benefits which made electronic coupons attractive to start with.

It should be noted that the background gray tone area 730 need not be limited to the size shown in FIG. 7. Indeed, in an alternative example it may comprise the entire background of the coupon 710. Moreover, the area, where glossmarks are embedded, could be other than a constant-tone background. It could be with textures, hash-marks, different patterns, or even complicated images. Furthermore, the bar codes 740 though depicted as printed upon coupon 710 in FIG. 7, may also be rendered upon the coupon 710 as glossmarks. In a similar manner, though not shown, serial numbers and tracking numbers could be rendered as information indicia glossmark images upon the coupon 710.

Figure 8:
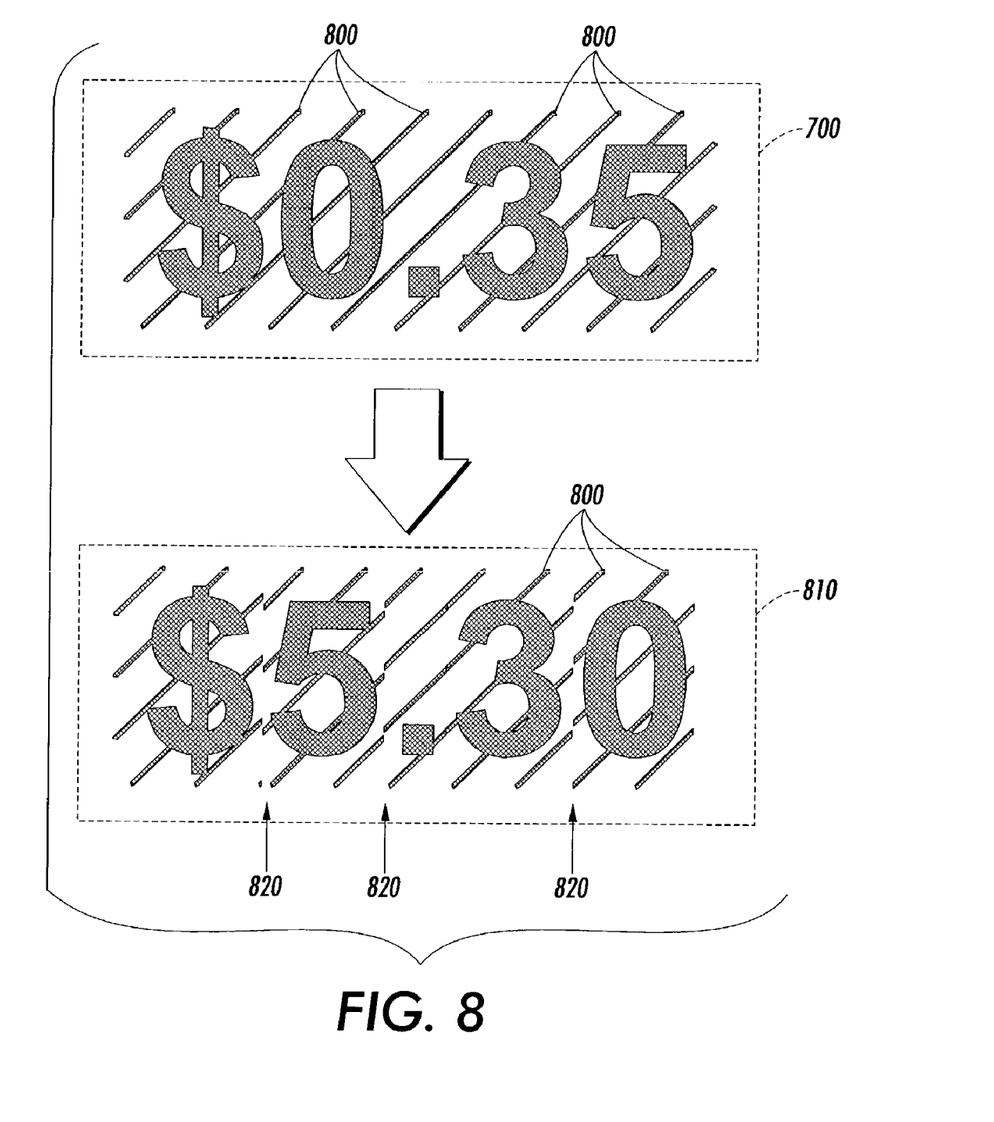
FIG. 8 shows a glossmark information indicia image before and after tampering.

FIG. 8 depicts the indicia of monetary value glossmark image 700 in isolation for further examination. In addition to the "$0.35" indicia there are provided thereupon hash-marks 800. The hash-marks 800 serve to provide visual indication of tampering. As currently available graphic manipulation software is unable to generate glossmark images, the only remaining approach for tampering with electronically distributed coupons containing glossmarks is with an block area "cut and paste" type of operation. FIG. 8 shows by example the result of just such an operation. Here, an attempt has been made to make the "$0.35" indicia read as "$5.30" simply by swapping the "5" and the "0" as depicted here in resulting glossmark image 810. However, such an approach will erupt in image discontinuities visible as seams indicated here by the arrows 820. As such, a clear visual indication of tampering is plainly made.

In FIG. 8, the hash-marks 800 are rendered as glossmarks. However, the hash-marks may also be rendered as normal background print as well or as part of background 730. More importantly, and as will be apparent to those skilled in the art, there are any number of patterns which may be used instead of hash-marks. The hash-marks or any other repeating pattern used will ideally have a periodicity which is different from the effective periodicity of the numeric or other information indicia. Indeed, the pattern need not be repeating so long as it is varying enough such that it will be apparent when tampering has occurred.

In closing, by applying sensitive print information as a glossmark information indicia image to various print items as would be used for public icons of exchange, the security and thereby the expanded availability for dissemination of such representations of exchange is meaningfully improved. This arrangement is exemplary for the accommodation of coupons and tickets. However, the invention as disclosed above, is not intended to be limited to coupons and tickets alone but also contemplates such items as certificates, passports, documents, citations, diplomas, currency and any other print items as may be comprised from printed items deemed desirable as icons for public exchange of value. The sensitive information or glossmark information indicia image may comprise time/date stamps, serial numbers, trademarks, indicia of monetary value, tracking codes, bar codes, logos, or any other indicia as would be desirably applied as a glossmark upon printed public icons of exchange, be they paper or other objects.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention. All such variants are intended to be encompassed by the following claims:

The invention claimed is:

1. A method for protecting a printed item comprising:
   printing a glossmark information indicia image upon the printed item, the glossmark information indicia image being realized by a methodology comprising:
   selecting a first halftone having a first anisotropic structure orientation;
   selecting a second halftone having a second anisotropic structure orientation different from that of the first halftone;
   applying the first halftone for at least some portion of the glossmark information indicia image; and
   applying the second halftone for the remaining portion of the glossmark information indicia image.

2. The method of claim 1 wherein the first anisotropic structure orientation and the second anisotropic structure orientation are 90 degrees apart.

3. The method of claim 2 wherein the first anisotropic structure has a 45 degree orientation to the right and the second anisotropic structure has a 45 degree orientation to the left.

4. The method of claim 1 wherein the first anisotropic structure orientation and the second anisotropic structure orientation are less than 90 degrees apart.

5. The method of claim 1 wherein the printing is with an ink jet printer.

6. The method of claim 1 wherein the printing is with an electrostaticgraphic printer.

7. The method of claim 1 wherein the printing is intended as printing upon paper.

8. The method of claim 1 wherein the printing is intended as printing upon a transparency.

9. The method of claim 1 wherein the printing is intended as printing upon an object other than paper.

10. The method of claim 1 wherein the glossmark information indicia image depicts a monetary value.

11. The method of claim 1 wherein the glossmark information indicia image depicts a serial number.

12. The method of claim 1 wherein the glossmark information indicia image depicts a tracking number.

13. The method of claim 1 wherein the glossmark information indicia image depicts a bar-code.

14. The method of claim 1 wherein the glossmark information indicia image depicts a trademark.

15. The method of claim 1 wherein the glossmark information indicia image depicts a logo.

16. The method of claim 1 wherein the glossmark information indicia image depicts a time/date stamp.

17. The method of claim 1 wherein the glossmark information indicia image depicts a program code.

18. The method of claim 7 wherein the print item is a coupon.

19. The method of claim 7 wherein the print item is a ticket.

20. The method of claim 7 wherein the print item is a certificate.

21. The method of claim 7 wherein the print item is a diploma.

22. The method of claim 7 wherein the print item is currency.

23. The method of claim 7 wherein the print item is a passport.

24. The method of claim 7 wherein the print item is an award.

25. The method of claim 7 wherein the print item is a document.

26. A print item comprising:
a substrate;
an information indicia glossmark image printed on the substrate, the information indicia glossmark image further comprising:
 an information indicia;
 a first halftone having a first anisotropic structure orientation; and
 a second halftone having a second anisotropic structure orientation different from the first halftone, where the first halftone is applied as to a portion of the information indicia glossmark image and the second halftone is applied as to the remainder of the information indicia glossmark image so as to depict the information indicia as a glossmark.

27. The print item of claim 26 wherein the anisotropic structure orientation of the first halftone and the anisotropic structure orientation of the second halftone are 90 degrees apart.

28. The print item of claim 26 wherein the anisotropic structure orientation of the first halftone and the anisotropic structure orientation of the second halftone are less than 90 degrees apart.

29. The print item of claim 26 wherein the print item is produced by an electrostaticgraphic printer.

30. The print item of claim 26 wherein the print item is produced by an ink jet printer.

31. The print item of claim 26 wherein the substrate is paper.

32. The print item of claim 26 wherein the substrate is a transparency.

33. The print item of claim 26 wherein the substrate is an object other than paper.

34. The print item of claim 26 wherein the print item is a coupon.

35. The print item of claim 26 wherein the print item is a ticket.

36. The print item of claim 26 wherein the print item is a certificate.

37. The print item of claim 26 wherein the print item is a diploma.

38. The print item of claim 26 wherein the print item is currency.

39. The print item of claim 26 wherein the print item is a passport.

40. The print item of claim 26 wherein the print item is an award.

41. The print item of claim 26 wherein the print item is a document.

42. The print item of claim 26 wherein the information indicia glossmark image depicts a monetary value.

43. The print item of claim 26 wherein the information indicia glossmark image depicts a serial number.

44. The print item of claim 26 wherein the information indicia glossmark image depicts a tracking number.

45. The print item of claim 26 wherein the information indicia glossmark image depicts a bar-code.

46. The print item of claim 26 wherein the information indicia glossmark image depicts a trademark.

47. The print item of claim 26 wherein the information indicia glossmark image depicts a logo.

48. The print item of claim 26 wherein the information indicia glossmark image depicts a time/date stamp.

49. The print item of claim 26 wherein the information indicia glossmark image depicts a program code.

50. A print item image comprising:
an information indicia;
a background data image;
a first halftone having a first anisotropic structure orientation; and
a second halftone having a second anisotropic structure orientation different from the first halftone where the first halftone is selectively applied as to a portion of the background data image and the second halftone is selectively applied as to a remainder of the background data image and where the information indicia is used to select when to toggle between the first and second halftones such that the resulting print item image when printed will depict the information indicia as a glossmark.

51. The print item image of claim 50 wherein the background data image is for a coupon.

52. The print item image of claim 50 wherein the background data image is for a ticket.

53. The print item image of claim 50 wherein the background data image is for a certificate.

54. The print item image of claim 50 wherein the background data image is for a diploma.

55. The print item image of claim 50 wherein the background data image is for currency.

56. The print item image of claim 50 wherein the background data image is for a passport.

57. The print item image of claim 50 wherein the background data image is for an award.

58. The print item image of claim 50 wherein the background data image is for a document.

59. The print item image of claim 50 wherein the information indicia is a monetary value.

60. The print item image of claim 50 wherein the information indicia is a serial number.

61. The print item image of claim 50 wherein the information indicia is a tracking number.

62. The print item image of claim 50 wherein the information indicia is a bar-code.

63. The print item image of claim 50 wherein the information indicia is a trademark.

64. The print item image of claim 50 wherein the information indicia is a logo.

65. The print item image of claim 50 wherein the information indicia is a time/date stamp.

66. The print item image of claim 50 wherein the background data image contains hash-marks.

67. The print item image of claim 50 wherein the background data image contains a pattern.

68. The print item image of claim 67 wherein the background data image contains a repeating pattern.

* * * * *